United States Patent [19]

Sekhar

[11] Patent Number: 5,094,700
[45] Date of Patent: Mar. 10, 1992

[54] SOLDER AND BRAZING ALLOYS HAVING IMPROVED PROPERTIES AND METHOD OF PREPARATION

[75] Inventor: Jainagesh A. Sekhar, Cincinnati, Ohio

[73] Assignee: University of Cincinnati, Cincinnati, Ohio

[21] Appl. No.: 497,338

[22] Filed: Mar. 22, 1990

[51] Int. Cl.$^5$ .................................... C22C 1/02
[52] U.S. Cl. .......................... 148/12.9; 420/560
[58] Field of Search .................. 148/12.9; 420/560

[56] References Cited

U.S. PATENT DOCUMENTS

| 3,146,097 | 8/1964 | Allen | 420/560 |
| 3,284,192 | 11/1966 | Larson et al. | 148/12.9 |
| 3,599,319 | 8/1971 | Weinsten | 148/12.9 |

FOREIGN PATENT DOCUMENTS

| 0141536 | 11/1980 | Japan | 148/12.9 |
| 0100643 | 6/1983 | Japan | 148/12.9 |
| 0159117 | 8/1985 | Japan | 148/12.9 |
| 0881129 | 11/1981 | U.S.S.R. | 148/12.9 |

OTHER PUBLICATIONS

Hiedemann; Jour. Acoust. Soc. Amer. 26 (Sep. 1954) 831.

Primary Examiner—Upendra Roy
Attorney, Agent, or Firm—Frost & Jacobs

[57] ABSTRACT

A solder or brazing alloy having improved properties by reason of the presence of at least one uniformly dispersed non-acicular and non-dendritic intermetallic phase having a particle size of about 1 to 25 microns. A method of preparing the alloy comprises melting the alloy at a temperature sufficient to melt the intermetallic phase or phases, cooling to a semi-solid state, subjecting the semi-solid alloy to vigorous shearing and/or vibration at the solid-liquid interface, and solidifying the alloy.

6 Claims, 1 Drawing Sheet

FIG. 1

SOLDER AND BRAZING ALLOYS HAVING IMPROVED PROPERTIES AND METHOD OF PREPARATION

BACKGROUND OF THE INVENTION

1. Field of the Invention

This invention relates to a method of improving the mechanical properties of solder and brazing alloys of the type which have coarse, acicular and/or dendritic intermetallic phases and to the product thereof. More particularly, the method of the invention involves subjecting a melt of the alloy, while in a semi-solid state, to vigorous shearing or vibration at the solid-liquid interface. Upon solidification, the intermetallic phase or phases precipitate as fine, non-dendritic structures.

2. Prior Art

Some recently developed solder and brazing alloys have a microstructure containing coarse, acicular and/or dendritic intermetallic phases of relatively high hardness, and melting points higher than those of the matrix alloys. These intermetallic phases may form bulky dendritic or pointed structures which extend throughout the length of the soldered or brazed joint and adversely affect the mechanical properties which are potentially obtainable. The intermetallic phases may also be interconnected and thus may form a brittle bridge between the joined parts which also degrades creep strength, adherence and other important properties.

For example, governmental restrictions on the use of lead-based solders in potable water supply means have led to the development of solder compositions which generally contain tin and/or indium. It is well known that most tin and indium-based alloys contain one or more intermetallic phases after solidification from the molten state.

In some operations the dendritic intermetallic phase is larger than the gap between the pieces which are to be soldered or brazed. When this occurs, on application of the solder or braze wire the molten alloy which fills the gap is deficient (commonly referred to as macrosegregation), i.e., the intended composition of the solder or braze is different from that which actually flows into the gap by reason of the fact that the intermetallic phase or phases do not enter the gap which forms the joint.

The prior art has used extrusion of these alloys as a means of breaking up these intermetallic phases. Extrusion has been successful in breaking up interconnected structures, but it does not change the acicular and/or dendritic shape thereof.

The prior art has also resorted to the expedient of adding small amounts of sodium to aluminum—silicon alloys in order to alter the microstructure, but this modification has not been successful in eliminating the dendritic structure of the intermetallic phase therein.

Definite problems therefore exist with solder and brazing alloys which contain coarse, acicular and/or dendritic intermetallic phases, which makes it impossible to realize the potential improvement in properties which a hard, high melting point intermetallic phase would otherwise confer if present in finely divided, non-acicular and non-dendritic form.

SUMMARY OF THE INVENTION

It is a principal object of the invention to provide a method which solves the above problem by converting coarse, acicular and/or dendritic intermetallic phases into fine, non-acicular and non-dendritic structures which contribute positively to creep strength, wear resistance, flowability and adherence of such solder and brazing alloys.

It is a further object of the invention to provide a solder alloy containing uniformly dispersed non-acicular and non-dendritic intermetallic phases which have a particle size of about 1 to 25 microns.

According to the invention there is provided a method of improving the properties of solder and brazing alloys which contain coarse, acicular and/or dendritic intermetallic phases having a higher melting temperature than that of the matrix alloy, which comprises melting such a solder or brazing alloy at a temperature sufficient to melt the intermetallic phases, cooling the alloy to a semi-solid state, subjecting the semi-solid alloy to vigorous shearing and/or vibration at the solid-liquid interface while in the semi-solid state, and solidifying the alloy whereby to obtain a microstructure wherein the intermetallic phases are present as fine, non-acicular and non-dendritic structures.

The invention further provides a tin based alloy containing at least one uniformly dispersed non-acicular and non-dendritic intermetallic phase therein, this phase having a particle size of about 1 to 25 microns.

Exemplary solder and brazing alloys which contain one or more intermetallic phases having coarse, acicular and/or dendritic structures include the following systems:

silver—copper—phosphorus
silver—zinc
silver—tin
silver—copper—tin
tin—antimony
tin—copper
aluminum—silicon
magnesium—aluminum
indium—tin
bismuth—lead All the above systems can be treated by the method of the invention to improve the mechanical properties thereof.

BRIEF DESCRIPTION OF THE DRAWINGS

Reference is made to the accompanying drawings wherein:

FIG. 1 is a photomicrograph at 50 X of the cast microstructure of a tin—4% copper alloy; and FIG. 2 is a photomicrograph of the microstructure at 50 X of a tin—4% copper alloy prepared in accordance with the method of the present invention.

DETAILED DESCRIPTION OF THE INVENTION

In the silver—copper—phosphorus system the method of the present invention will refine the phosphide intermetallic phase. The following intermetallic phases will also be refined in accordance with the present invention:

silver—zinc $\gamma$, $\epsilon$($Ag_5Zn_8$, Ag—Zn)
silver—tin $\gamma$, $\gamma'(Ag_3Sn$, Ag—Sn)
silver—copper—tin $\epsilon$(similar to Ag—Sn binary)
tin—antimony $\beta$, $\beta'$(Sb, Sn)
tin—copper $\eta$, $\eta'(Cu_3Sn, Cu_{31}Sn_8, Cu_{20}Sn_6)$
aluminum—silicon Si
magnesium—aluminum $\beta,\beta'(Al_3Mg_2$, $Al_{30}Mg_{23}$, $Al_{12}Mg_{17})$ indium—tin$\beta$(In$_3$ Sn, In Sn$_4$)
bismuth—lead$\beta$(Bi Pb$_3$)

Referring to FIG. 1, which is a photomicrograph at 50 X of the tin—4% copper alloy which has been merely cast and solidified, it is evident that the intermetallic phase $\eta$ precipitates in the form of relatively massive dendritic structures, some of which are interconnected. This phase has a melting temperature of 415° C. and hence will precipitate upon cooling of the molten alloy at temperatures substantially higher than the melting point of the matrix. The $\eta$ phase changes crystal structure by solid state transformation to the $\eta'$ phase at 186° C. but does not change in composition or morphology. When a soldering operation is later carried out, the intermetallic phases will melt only partially, thus forming a solder joint having a microstructure similar to that shown in FIG. 1, which is inherently weak, due to brittle bridging mechanisms, poor flowability and poor adherence.

FIG. 2, which is a photomicrograph at 50 X of the same alloy as that of FIG. 1 subjected to vigorous shearing in accordance with the invention, shows clearly the marked change in microstructure of the intermetallic phases. These phases are much finer in size and appear to have substantially no acicular or dendritic grains. The microstructure is relatively homogeneous throughout. In this form the intermetallic phases do not adversely affect mechanical properties but rather improve the creep strength, wear resistance, flowability, adherence and other properties. As pointed out above, since the intermetallic phases normally are not melted fully during the soldering or joining operation, the improved microstructure of FIG. 2 remains in the joint. Accordingly, no brittle bridging mechanisms are present.

The solder or brazing alloy of the invention also avoids the problem of macrosegregation described above, since the particle size of the intermetallic phase or phases is smaller than the gap between pieces to be joined, and these phases thus readily flow into the joint. The overall composition of the joint will thus be the same as that of the solder or braze wire. Improved mechanical properties of the joint can thus be attained.

Adherence is improved because no acicular or dendritic intermetallic phases project outwardly from the surfaces of the alloy.

Moreover, extrusion can be effected much more easily, and there is less wear and abrasion on the extrusion dies.

The term "vigorous shearing" as used herein should be understood to define an operation wherein the amount of shear is preferably greater than 1000%. The rate of shear preferably is greater than 0.5 to 1 mm/mm sec.

Shearing or vibration may be effected in any conventional manner and with conventional equipment. Either batch or continuous mixers may be used. Suitable equipment includes the Banbury Mixer, double blade mixer with sigma blades or overlapping blades, the Farrel Continuous Mixer (U.S. Pat. No. 3,154,808, issued 1969 to P. Hold et al), a centrifugal impact mixer, a so-called "motionless" mixer (such as the Ross Interfacial Surface Generator), and the like. Conventional ultrasonic agitation may also be used to ensure that the relatively fine grains of the intermetallic phase or phases remain uniformly dispersed in the semi-solid alloy, as well as to break up acicular and/or dendritic intermetallic phases. A suitable ultrasonic processor is sold under the trademark "Vibra-Cell", Models VC300/VC600, by Sonics and Materials, Inc.

EXAMPLE 1

A tin—copper alloy containing about 4% copper and balance tin aside from incidental impurities was heated to a temperature of 450° C. and held at temperature until completely molten. The alloy was then cooled until it reached a semi-solid state, at which time it was subjected to vigorous shearing in a Banbury type mixer and permitted to solidify. A sample was polished and etched in conventional manner, and a photomicrograph at 50 X was prepared, shown as FIG. 2. The intermetallic phases were uniformly dispersed, exhibited no sharp angularity and had an average grain size of 1 to 25 microns. Upon remelting at a temperature of about 375° C., and resolidification, the microstructure of FIG. 2 was substantially replicated.

Comparative tests were conducted, from which it was determined that tensile ductility was improved by 50%, and hardness was improved by 15%. It is well known in the art that when fine precipitates are present, the wear resistance and creep life will increase along with hardness.

EXAMPLE 2

A tin-silver alloy containing about 10% silver and balance tin aside from incidental impurities was melted at 310° C. and solidified, with half of the melt being subjected to agitation and the other half solidified without agitation. The matrix of the portion not subjected to agitation contained the intermetallic phase (Ag$_3$Sn) in the form of large sharp dendrites similar to those shown in FIG. 1. The agitation of one portion was effected by shearing in a mixer and by ultrasonic vibration at 20KHz through an immersed piezoelectric crystal. The intermetallic phase was in fine particulate form with an average size of about 2 microns.

On remelting at 200° C. and pouring the same volume of each portion through a funnel, the unagitated portion took 50 seconds while the agitated portion took only 40 seconds. The improvement in fluidity was thus about 20%.

Modifications will be apparent to those skilled in the art and are considered to be within the scope of the invention. No limitations are to be inferred except as set forth in the appended claims.

I claim:

1. A method of improving the properties of solder and brazing alloys which contain at least one coarse, acicular and/or dendritic intermetallic phase having a higher melting temperature than that of the matrix alloy, which comprises melting said solder or brazing alloy at a temperature sufficient to melt said at least one intermetallic phase, cooling said alloy to a semi-solid state, subjecting the semi-solid alloy to vigorous shearing and/or vibration at the solid-liquid interface while in said semi-solid state, and solidifying said alloy whereby to obtain a microstructure wherein said at least one intermetallic phase is present as a fine, non-acicular and non-dendritic structure.

2. The method of claim 1, wherein said vigorous shearing involves an amount of shear greater than 1000% and a rate of shear greater than 0.5 to 1 mm/mm sec.

3. The method of claim 1, wherein said alloy is chosen from the group consisting of tin—copper, silver—copper—phosphorus, silver—zinc, silver—tin, silver—copper—tin, tin—antimony, silicon—aluminum, magnesium—aluminum, indium—tin, and bismuth—lead.

4. A solder alloy containing at least one intermetallic phase, produced by the method of claim 1, wherein said at least one intermetallic phase is in the form of uniformly dispersed non-acicular and non-dendritic particles having a size of about 1 to 25 microns.

5. The method of claim 3, wherein said alloy is a tin—copper system containing about 4% copper and balance tin aside from incidental impurities, and wherein said alloy is melted at a temperature above about 415° C.

6. The method of claim 3, wherein said alloy is a tin—silver system containing about 10% silver and balance tin aside from incidental impurities, and wherein said alloy is melted at a temperature of at least 310° C.

* * * * *